2,950,182

METHOD OF TREATING TOMATO PLANTS EMPLOYING A MIXTURE OF BETA-NAPHTHOXY-ACETIC ACID AND BORON

Emery M. Emmert, Lexington, Ky., assignor, by mesne assignments, to The Kentucky Research Foundation, Lexington, Ky., a corporation of Kentucky No Drawing. Filed Mar. 25, 1958, Ser. No. 723,660

3 Claims. (Cl. 71—2.1)

This invention relates to the treatment of growing plants with plant hormones and more particularly to the treatment of plants during the blossoming stage for producing an improved setting of fruit.

This application is a continuation-in-part of my copending application, Serial No. 546,769, filed November 14, 1955, now abandoned.

I have discovered that boron, when used in sprays in the proper concentration, effectively assists in the fruit setting action of the hormone, as well as in the sizing of the later fruit, as when a nutrient is employed either separately or in conjunction with the hormone application. It has heretofore been suggested by others that trace amounts of boron may advantageously be used in connection with hormones for treating plants, but so far as I am aware the use of comparatively massive weight ratios of boron to hormone in spray compositions, has not been practiced heretofore. Although excess amounts of boron have a tendency to injure leaves of the plant and to brown or blacken plant tissues, a suitable concentration in the spray, appears, on the contrary to have no adverse effect on the plant physiology, even when the weight ratio of the boron to the hormone is exceptionally high by previous teachings and provided the total amount of boron present, as the element, does not exceed 200 parts per million by weight of the composition being so applied. Furthermore, proper concentrations of boron give evidence of a synergistic effect when employed with the plant hormone alone; with a nutrient alone; or with a combinaton of the hormone and the nutrient.

An object of the invention is to provide an improved composition for setting fruit of plants.

Another object is to provide an improved composition for sizing of plant fruit.

Another object is to provide an improved composition for setting and for sizing the fruit of plants.

Another object is to provide an improved composition for treating plants in order to produce an increased early yield of fruit therefrom.

A further object is to provide an improved plant spray, which may be easily prepared by adding prescribed amounts of water to previously prepared materials capable of being prepared, shipped, and stored in concentrated form.

A further object is to provide an improved plant dusting composition.

Still a further object is to provide an improved plant spray by means of which fruit setting, fruit sizing, plant disease and insect control treatments may be accomplished in a single application.

Other objects and advantages will become apparent from the following description.

As set forth in the United States patent to Schomer et al. No. 2,435,056, the conventional methods of applying plant response agents to growing plants have frequently constituted a problem; particularly in commercial usages, the time and labor required for optimum treatment, the cost of materials, and the difficulty of guaranteeing the adequacy of treatment without damage to the plant, have imposed limitations upon the compositions employed. By means of my invention, the user may treat the plants either by direct application of a dust-like composition blown thereon by conventional dusting apparatus, or by direct application of a liquid spray using a conventional spraying apparatus. Neither the dust nor the spray has to be limited to contact with the blossom portion of the plant, and when using the spray the treatment can range from a dampening to a full soaking of the plant. Relatively unskilled labor accordingly may be used.

Moreover, several ingredients having specific action upon the plant may be incorporated into the composition due to the beneficial action of the boron element present therein. This mechanism is not fully understood but it appears that the element boron when used alone serves to enhance the normal fruit setting action of the plant; when used with sugar it appears to form a compound which increases the sugar absorption of the plant and keeps the sugar from readily washing off the plant prior to absorption; and when used with hormone agents it appears to act as a carrier or to form a compound which enters readily into the plant metabolism.

Various beneficial results accordingly are obtained, such as an increase in total yield of fruit from the plant and in the case of certain products such as tomatoes, a marked increase in the yield of early fruit which often commands a premium market price. For example, when tomato plants are treated with my improved compositions in early spring at a time when cold weather may still be expected, a substantial increase in the amount of early fruit produced, nevertheless, may be achieved as contrasted with untreated plants.

In the following examples and tables the invention is described in connection with the treatment of various varieties of tomatoes and with the composition being used in the form of a water spray, although the invention is in no way limited to that sole usage or that sole type of plant. The varieties of Valiant, Early Giant, Hybrid, Spartan Hybrid, and Michigan-Ohio Hybrid tomatoes were treated and gave consistent results. During the treatment for fruit setting alone, the plant hormone employed was either pure beta naphthoxyacetic acid (abbreviated as BNAA in certain tables), or beta naphthoxyacetic acid in a commercially available solution marketed under the trade name "Blossom-Set."

During the treatment for adding nutrient, the sugar employed was a commercial dextrose dissolved from a powdered form. The boron element employed was either boron derived from a commercial grade of boric acid or from disodium octaborate tetrahydrate ($NA_2B_8O_{13}4H_2O$) (abbreviated in certain tables as DOT). In carrying out the invention in the presence of disease and insection control agents, the disease control agent was a commercially available product marketed under the trade name "Manzate" and containing a manganese compound, while the insect control agent was either "Parathion" or "Malathion" which are commercially available products marketed under these well-known trade names.

In the following examples and tables, I have for clarity, related the proportions of the several ingredients of my improved compositions to parts per million by weight. That is, if one million pounds of water spray solution having disodium octaborate tetrahydrate as the source of the boron element; water as the diluent; and a suitable hormone is to be produced with a concentration of 100 p.p.m. of boron and 35 p.p.m. of hormone, the quantity would comprise approximately:

|  | Pounds |
| --- | --- |
| Disodium octaborate tetrahydrate | 480 |
| Hormone | 35 |
| Water | 999,385 |

Moreover, when sugar, such as dextrose, is used, the weight of the sugar would cause a corresponding diminution of the weight of water used. By the same token, the weight of disease and insect control agents used will cause a corresponding diminution in the diluent.

By contrast, entirely different ratios are needed when employing the composition in dust form. It appears that when using dust, the applied dry ingredients must await a dissolving by rain or dew before reaching the critical plant tissues. In one usage of dust, if one million pounds of composition is to be prepared for use on mature plants, and having a concentration of 7508 p.p.m. of boron and 12,000 p.p.m. of hormone, the quantity would comprise approximately:

| | Pounds |
|---|---|
| Disodium octaborate tetrahydrate | 36,000 |
| Hormone | 12,000 |
| Talc (as diluent) | 952,000 |

Here too, the weight of the diluent will be decreased depending upon the weight of the powdered sugar or other materials employed. Moreover, when used with young, tender plants, I have found that about a four-fold dilution giving about 1877 p.p.m. of boron and 3,000 p.p.m. of hormone in the dust appears to be most satisfactory.

Example 1

Tomato plants were sprayed in the field with a water spray having the ingredients shown in Table 1. The plants were initially sprayed when the first yellow color appeared in the first 3-4 blooms and were later resprayed whenever about the same number of new blooms appeared. During the several sprayings no effort was made to limit the spray contact to the bloom or to the set fruit. No plant received more than one type of spray.

TABLE 1

[Total yield of field tomatoes treated without added nutrient and in absence of supplementary agents for controlling insects and plant diseases.]

| Spray ingredients | Approximate concentration, p. p. m. | Total pounds per plant |
|---|---|---|
| Control | | 7.55 |
| Boron (from boric acid) | 50 | 7.60 |
| Boron (from DOT) | 100 | 8.73 |
| BNAA | 50 | 7.47 |
| BNAA | 12.5 | 8.68 |
| BNAA (from Blossom Set) | 50 | 8.48 |
| boron (from DOT) | 50 | |
| with BNAA (from Blossom Set) | 50 | 9.17 |

As compared with the control plants, those plants receiving boron alone or beta naphthoxyacidic acid alone, in the concentration shown, averaged a maximum of about 15% increase in total weight of tomatoes, whereas those plants receiving a mixture of these agents averaged a maximum of about 21% increase. When the hormone was employed the appearance of the fruit upon being cut open was better than that of the control fruit, having less seed and more meat. Furthermore, in the above table full advantage of the reduction in the use of the relatively more expensive plant hormone (which presently costs about 80–100 times as much as disodium octaborate tetrahydrate) made possible by its joint use with boron, is not shown whereas this valuable property is exemplified in Table 2.

Example 2

Tomato plants were sprayed in the field with a water spray having the ingredients shown in Table 2, together with about 2500 parts per million by weight of manganese ethylene bis di-thio carbamate derived as the plant disease control agent from the Manzate and about 1500 parts per million by weight of O-o-diethyl-o-p-nitrophenyl phosphate derived as the insect control agent from Parathion. The plants were sprayed under the same conditions as in Example 1.

TABLE 2

[Total yield of field tomatoes without added nutrient but with supplementary agents for controlling insects and plant diseases.]

| Spray ingredients | Approximate concentration, p. p. m. | Total pounds per plant |
|---|---|---|
| Control | | 10.20 |
| Boron (from boric acid) | 50 | 9.90 |
| Boron (from DOT) | 50 | 10.23 |
| BNAA | 50 | 8.90 |
| BNAA (from Blossom Set) | 50 | 10.00 |
| boron (from boric acid) | 50 | |
| with BNAA (from Blossom Set) | 50 | 11.83 |
| boron (from DOT) | 50 | |
| with BNAA | 12.5 | 12.37 |
| boron (from boric acid) | 50 | |
| with BNAA | 12.5 | 12.73 |
| boron (from DOT) | 50 | |
| with BNAA (from Blossom Set) | 12.5 | 13.57 |

As compared with the control plants, those plants receiving only a boron or only a hormone spray produced no significant change in the weight of fruit. However, those plants receiving a mixed boron and hormone spray averaged a maximum of about 32% increase. In all cases of this mixture, at least as much boron as hormone (by weight) was used and best results were found when four times as much boron as hormone was used. Accordingly for practical reasons, I regard as a feature of the invention the use of not less than twice as much boron as hormone by weight, which by the standards found in the prior art represents a massive use of boron.

Significantly, those plants receiving the same amount of boron and one-fourth the amount of hormone averaged appreciably higher yields. Use of the relatively inexpensive boron in large amounts therefore, appears to make possible the use of smaller amounts of the relatively expensive hormone.

Example 3

Tomato plants were sprayed in the field with a water spray having the ingredients shown in Table 3. The dextrose was dissolved from a powdered form and the plants were sprayed under the same conditions as in Example 1.

TABLE 3

[Total yield of field tomatoes with added nutrient and in absence of supplementary agents for controlling insects and plant diseases]

| Spray Ingredients | Approximate concentration | Total pounds per plant |
|---|---|---|
| Control | | 7.55 |
| Sugar (dextrose) | 0.25 M | 9.28 |
| Sugar (dextrose) | 0.50 M | 7.66 |
| Sugar (dextrose) | 0.25 M | |
| with boron (from boric acid) | 50 p.p.m. | 8.65 |
| with BNAA (from Blossom Set) | 12.5 p.p.m. | |
| Sugar (dextrose) | 0.25 M | |
| with boron (from DOT) | 25 p.p.m. | 8.71 |
| Sugar (dextrose) | 0.25 M | |
| with boron (from DOT) | 50 p.p.m. | 8.82 |
| with BNAA (from Blossom Set) | 25 p.p.m. | |
| Sugar (dextrose) | 0.25 M | |
| with boron (from boric acid) | 100 p.p.m. | 9.54 |
| Sugar (dextrose) | 0.25 M | |
| with boron (from DOT) | 50 p.p.m. | 11.08 |
| with BNAA (from Blossom Set) | 50 p.p.m. | |

As compared with the control plants, a significant increase in yield was obtained using sugar alone. However, the sugar in concentrations shown is relatively expensive and may easily be washed from the plants by rain. Used in conjunction with boron, the sugar appears to be more efficiently utilized and to give an increase of fruit as high as 26%. Use of boron, sugar, and hormone jointly gave an increase in total fruit of as much as 46%.

Example 4

Tomato plants were sprayed in the field with a water spray having the ingredients shown in Table 4 together with the amounts of insect and disease control agents used in Example 2. The plants were sprayed under the same conditions as in Example 1.

TABLE 4

[Total yield of field tomatoes with added nutrient and employing supplementary agents for controlling insects and plant diseases]

| Spray Ingredients | Approximate concentration | Total pounds per plant |
|---|---|---|
| Control | | 10.20 |
| Sugar (dextrose) | 0.25 M | 11.43 |
| Sugar (dextrose) | 0.50 M | 10.97 |
| Sugar (dextrose) with boro (from DOT) | 0.25 M / 100 p.p.m | 11.63 |
| Sugar (dextrose) with BNAA (from Blossom Set) | 0.25 M / 12.5 p.p.m | 11.63 |
| Sugar (dextrose) with BNAA (from Blossom Set) | 0.25 M / 25 p.p.m | 11.87 |
| Sugar (dextrose) with boron (from boric acid) with BNAA (from Blossom Set) | 0.25 M / 50 p.p.m / 50 p.p.m | 12.10 |
| Sugar (dextrose) with boron (from DOT) with BNAA (from Blossom Set) | 0.25 M / 50 p.p.m / 12.5 p.p.m | 14.13 |

As compared with the control plants, those plants receiving sugar alone had a maximum increase of fruit of about 12%, but when using sugar, hormone, and boron jointly, the increase was high as 38%.

Results similar to those depicted in the foregoing tables were achieved when the invention was used in spray form upon tomatoes grown in plastic and in glass greenhouses. Even more striking results were achieved as regards the early yields, both of tomatoes grown in the field and in the protected environments. On all cases, the use of boron in excess of 200 parts per million by weight of spray was disadvantageous.

In using the invention by application of dust to the plants, I have obtained results in the treating of potatoes, tomatoes and Lima beans, which while not as complete as the above tabulated examples, nevertheless show a correlation to the results obtained in using the spray application. Since disodium octaborate tetrahydrate, dehydrated boric acid, dextrose, beta naphthoxyacetic acid, Manzate, and Parathion, all are available in powdered form, it is a relatively simple matter to mix the same in the desired concentrations with dilution by means of a powdered inert material matrial such as talc. A suitable composition in dust form may comprise essentially about 12,000 parts per million by weight of powdered beta napthoxyacetic acid, 7508 p.p.m. of boron as the element contained in disodium octaborate tetrahydrate and with dilution by a commercially available talc. While the significant savings in cost of the hormone made possible in the spray usage is not present in the dust usage, other compensating advantages are to be found such as the ease in mixing, storing and applying the composition.

In using the invention in the spray application, I prefer to provide a concentrated liquid solution containing the proper relative proportions of boron and plant hormone and which may be conveniently shipped and stored. Likewise, I also prefer to provide a dry mixture of sugar and plant disease control agent in the proper relative proportions. The dry ingredients may first be mixed with a small amount of hot water to form a syrup which then is mixed with the proper amount of boron-hormone liquid. This mixed liquid may then be diluted with the proper volume of water to form the spray solution. Normally, and as known in this art, the commercial plant hormone is dissolved in a suitable solvent, such as alcohol, but the dilution afforded by the water when the improved spray solution is manufactured, makes the presence of such supplementary solvent a negligible factor in the composite composition. When employing the optional insect control agent, such agent preferably is added separately to the spray solution while observing due precautions which may be necessary as the result of the toxic nature of certain classes of such agents.

In using a supplementary plant disease control agent, I prefer to employ about 2500 parts per million by weight of the final spray in the form of the active plant disease ingredient. Likewise, when using the supplementary insect control agent, I prefer to employ about 1500 parts per million by weight of the final spray in the form of the active insect control agent and to add the same separately.

It will be understood that in its broader aspects the invention comprehends the use of only the diluted boron and hormone mixture either in dry form as a dust composition or in the above described liquid form, as a spray solution.

When sizing of fruit is the intended use of the invention, boron and sugar alone may be incorporated into the spray solution by separately or jointly mixing the same with a small amount of hot water and further diluting the resultant syrup to form the spray solution. In this usage, a boron concentration of between 25 and 200 parts per milllion by weight and sugar capable of giving a molar concentration of between 0.10 M and 0.50 M in the spray solution, is satisfactory. Preferably, however, a boron concentration of about 50–100 parts per million and a sugar concentration of about 0.25 M, or its equivalent is used. It is found that when the nutrient sugar solution is employed in treating tomatoes the locules of the treated fruit are substantially filled and the fruit noticeably contains more meat and is heavier. Any of several sugars may be employed, both sucrose and dextrose having been used successfully. However, I prefer to employ dextrose since it is relatively inexpensive and has a lower molecular weight, thus requiring a smaller amount to provide the required molar concentration.

In addition to the treatment of tomatoes by means of my invention, I have employed successfully both the dust and spray forms of the composition, in the treatment of Lima beans, the following example showing the use of the spray form:

*Example 5*

Lima beans of the Fordhook 242 variety were sprayed with a water solution containing about 50 parts per million by weight of boron as the element and about 0.25 M sugar in the form of dextrose. The plants were sprayed when the blooms were first showing to a substantial extent and were later resprayed while the pods were setting. As compared with control plants, the plants which were thus treated gave an increase in total fruit equivalent to about 200 pounds per acre.

Other plant hormones for setting fruit and employed in connection with my invention in the treatment of tomatoes, have included para chlorophenoxyacetic acid derived from "Sure-Set," a commercially available product marketed under this trade name and N-metalolyl phthalanic acid derived from "Dura-Set"; a commercially available product marketed under this trade name.

From the foregoing description it will be noted that significant increases in production of fruit may be achieved by employing boron in conjunction with a fruit setting hormone, or with a nutrient for sizing fruit or for both purposes. The boron concentration should not exceed 200 parts per million by weight in the spray solution lest damage occur to the plant or the fruit, and should not be less than 25 parts per million. I prefer to use the range of about 25–100 parts per million.

As shown, the presence of boron in these relatively massive amounts by prior art standards, permits a reduction in the amount of hormone required in the spray, which, when used without boron may customarily be as high as 50 parts per million. I prefer to use sufficient boron to permit not more than 25 parts per million of hormone, and even as low as 5.0 parts per million to be employed and throughout all ranges in the spray form, I employ at least twice as much boron as the element, than I do of hormone, based upon weight. When using dextrose sugar as a nutrient, I prefer to employ sufficient boron to permit a molar concentration of sugar not exceeding 0.5 M, and preferably not over 0.25 M to be used. With proper boron concentration, even as low as 0.10 M sugar concentration may be employed with significant benefit.

In the employment of the invention no separate stops of spraying or dusting for separate specific purposes is required. At the choice of the user, the plant hormone in relatively reduced amounts over prior practices, may thus be applied to the plants in conjunction with any or all of a nutrient, a plant disease, and an insect control agent. Repeated applications to the same plants may be conducted without damage to the plant or fruit and for a given application, in the case of the spray, the plant treatment may range from a good dampening by that spray to a complete soaking of the same.

Having thus described my invention, what is claimed is:

1. The method of treating tomato plants to produce an increased yield of early fruit therefrom, including, initially spraying the plants when the yellow color appears in a plurality of the first blooms thereof, and subsequently spraying the same plants after approximately the same number of additional new blooms have appeared thereon, each of said sprayings including the application of sufficient solution to the plant to insure at least a substantial dampening of the plant, the spraying in each case comprising a direct application to the plant of a water solution having a mixture of boron, plant hormone consisting of beta naphthoxyacetic acid and water, said boron having a concentration, as the element, of between 25 and 200 parts per million by weight of the solution and said plant hormone having a concentration of between 5.0 and 50 parts per million by weight of the solution, the weight of the boron present as the element being at least twice the weight of the hormone present.

2. The method of treating tomato plants to produce an increased yield of early fruit therefrom including, initially spraying the plants when the yellow color appears in a plurality of the first blooms thereof, and subsequently spraying the same plants after approximately the same number of additional new blooms have appeared thereon, each of said sprayings including the application of sufficient solution to the plant to insure at least a substantial dampening of the plant, the spraying in each case comprising a direct application to the plant of a water solution having a mixture of boron contained in disodium octoborate tetrahydrate, beta napththoxyacetic acid, and water, said boron having a concentration, as the element, of between 25 and 200 parts per million by weight of the solution, and said beta naphthoxyacetic acid having a concentration of between 5.0 and 50 parts per million by weight of the solution, the weight of the boron present as the element being at least twice the weight of the beta naphthoxyacetic acid present.

3. In a method of treating tomato plants comprising mixing water, a boron-containing substance, sugar and a plant hormone to provide a solution including between 25 and 200 parts per million by weight of boron, as the element, and a plant hormone consisting of beta naphthoxyacetic acid and having a concentration of between 5.0 and 50 parts per million by weight, and with a molar concentration of between 0.01 M and 0.50 M of sugar, the weight of said boron present as the element being at least twice the weight of the hormone present, and applying said composition to the tomato plant, the steps comprising spraying said solution upon the plant initially when the yellow color appears in a plurality of the first blooms of the plant, and subsequently spraying the same plants with said solution after approximately the same number of additional blooms have appeared upon the sprayed plant, each of said sprayings including the application of sufficient solution to the plant to insure at least a substantial dampening of the plant.

References Cited in the file of this patent

UNITED STATES PATENTS

| 2,291,693 | Colla | Aug. 4, 1942 |
| 2,654,668 | Weibel | Oct. 6, 1953 |
| 2,768,889 | Twomey et al. | Oct. 30, 1956 |

FOREIGN PATENTS

| 740,148 | Germany | May 12, 1943 |

OTHER REFERENCES

Avery et al.: In "Hormones and Horticulture," McGraw-Hill Book Co., Inc., New York, 1947, pages 159–161.

Zimmerman: "Industrial and Engineering Chemistry," vol. 35, No. 5, pp. 596–601 (1943).